US006970458B1

(12) United States Patent
Lim

(10) Patent No.: US 6,970,458 B1
(45) Date of Patent: Nov. 29, 2005

(54) METHOD OF INCREASING SWITCH CAPACITY

(75) Inventor: Jae Kwan Lim, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/373,704

(22) Filed: Aug. 13, 1999

(30) Foreign Application Priority Data

Aug. 18, 1998 (KR) .................................... 98-33454

(51) Int. Cl.[7] .......................................... H04Q 11/00
(52) U.S. Cl. ...................................... 370/387; 370/388
(58) Field of Search ................................ 370/370, 372, 370/386, 387, 388, 254, 367, 419

(56) References Cited

U.S. PATENT DOCUMENTS 5,032,837 A * 7/1991 Yoshifuji ................. 340/825.8

* cited by examiner

Primary Examiner—Wellington Chin
Assistant Examiner—Brenda Pham
(74) Attorney, Agent, or Firm—Fleshner & Kim, LLP

(57) ABSTRACT

Disclosed a method of increasing the whole switch capacity by utilizing the presently used switch network as it is. The present invention, the method of increasing a switch capacity in a switch network system in which three or more switch stages including a plurality of switching elements are connected in serial by using a predetermined logical circuit, the method comprising the steps of: adding switch stage including a plurality of switching elements to correspond to the each switch stage; grouping switching elements of a first switch stage and last switch stage in the switch stage and the added switch stage by a predetermined unit, respectively; and connecting the grouped switching elements of the first stage with corresponding switching elements of an intermediate switch stage which is placed between the first stage and last stage, respectively, and connecting the grouped switching elements of the last switch stage with the corresponding switching elements of the intermediate switch stage, respectively.

12 Claims, 7 Drawing Sheets

METHOD OF INCREASING SWITCH CAPACITY

BACKGROUND OF THE INVENTION

1. Field of the Invention

The present invention relates generally to a cross connect system. In particular, the present invention relates to a switch capacity increasing method which can increase the switch capacity by utilizing the existing switch network as it is.

2. Background of the Related Art

Generally, a 3-stage Clos switch network as shown in FIG. 1 has been widely used in a cross connect system. Referring to FIG. 1, the 3-stage Clos switch network comprises a first stage 10 having a plurality of switching elements 10a–10n, a second stage 20 having a plurality of switching elements 20a–20n connected to the switching elements 10a–10n of the first stage 10 in a many-to-many relationship, and a third stage 30 having a plurality of switching elements 30a–30n connected to the switching elements 20a–20n of the second stage 20 in a many-to-many relationship.

Here, the whole switch capacity N of the switch network is predetermined when the switch network is designed. If the number of input/output of a switching element is defined by n, the ratio of the input number to the output number of each switching element in the first stage 10 becomes n×2n, and the ratio of the input number to the output number of each switching element in the third stage 30 becomes 2n×n.

Also, the ratio of the input number to the output number of each switching element in the second stage 20 becomes N/n×N/n. Accordingly, the first stage 10 and the third stage 30 have a symmetrical arrangement based on the second stage 20.

Such a switch network as described above has the reduced number of cross points and high accessibility of crossbars, and a non-blocking is effected when two terminal points are connected to each other since at least one path is provided through the network to connect the two terminal points together. Because of the above reason, there is a tendency to apply the switch network as shown in FIG. 1, for instance, to the product name DACS IV (digital access communication system IV) manufactured by Lucent in the United States and to the product name 1631SX manufactured by Alcatel in the United States.

In the above-described switch network, the switching elements in the respective stages 10–30 are inserted into a shelf of the cross connect system in the form of a module or unit. On the rear surface of the shelf is provided a mother board in which a plurality of patterns for connecting input/output terminals of the respective modules as designed. Accordingly, the designer of the cross connect system should design or produce the switch network after determining the whole switch capacity of the switch network required at the present time and in the future.

In the conventional cross connect system as shown in FIG. 1, the method of increasing the whole capacity of the switch network may be classified into two.

One method is to produce the switch network having the switch capacity of 2N if the designer judges that the whole switch capacity required at the present time is N, but the switch capacity of 2N will be required thereafter. Another method is to produce and use the switch network having the switch capacity of N, and if required thereafter, to produce a new switch network having the switch capacity of 2N without using the previous switch network having the switch capacity of N any more.

However, the former method has problems that unnecessary expenses are spared on producing the switch network having the switch capacity of 2N though the switch capacity of N is only required at the present time. The latter method also has problems that excessive expenses are spared on producing a new switch network having the switch capacity of 2N since the previous switch network having the switch capacity of N is not used any more.

Such problems are caused by the fixed structure of the produced switch network. Specifically, the fixedly patterned structure of the shelf and the mother board of the cross connect system, which is just like a printed circuit board (PCB), causes the problems in case of increasing the switch capacity of the present switch network.

SUMMARY OF THE INVENTION

Accordingly, the present invention is directed to a switch capacity increasing method that substantially obviate one or more of the problems due to limitations and disadvantages of the related art.

An object of the present invention is to provide a method of increasing switch capacity which can increase the whole switch capacity by utilizing the presently used switch network as it is.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of increasing a switch capacity in a switch network system in which three or more switch stages including a plurality of switching elements are connected in serial by using a predetermined logical circuit, the method comprising the steps of: adding switch stage including a plurality of switching elements to correspond to the each switch stage; grouping switching elements of a first switch stage and last switch stage in the switch stage and the added switch stage by a predetermined unit, respectively; and connecting the grouped switching elements of the first stage with corresponding switching elements of an intermediate switch stage which is placed between the first stage and last stage, respectively, and connecting the grouped switching elements of the last switch stage with the corresponding switching elements of the intermediate switch stage, respectively.

In another aspect, a method of increasing a switch capacity in a switch network system in which three or more switch stages including a plurality of switching elements are connected in serial by using a predetermined logical circuit, the method comprising the steps of: adding switching elements to an intermediate switch stage which is placed between the first stage and last stage, respectively; and connecting extra input/output terminals of switching elements in first and last switch stages with the added switching elements, respectively.

According to the aspects of the present invention as described above, the whole switch capacity can be increased by adding a new switch network to the presently used switch network and manually changing the connection of the respective switching elements.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
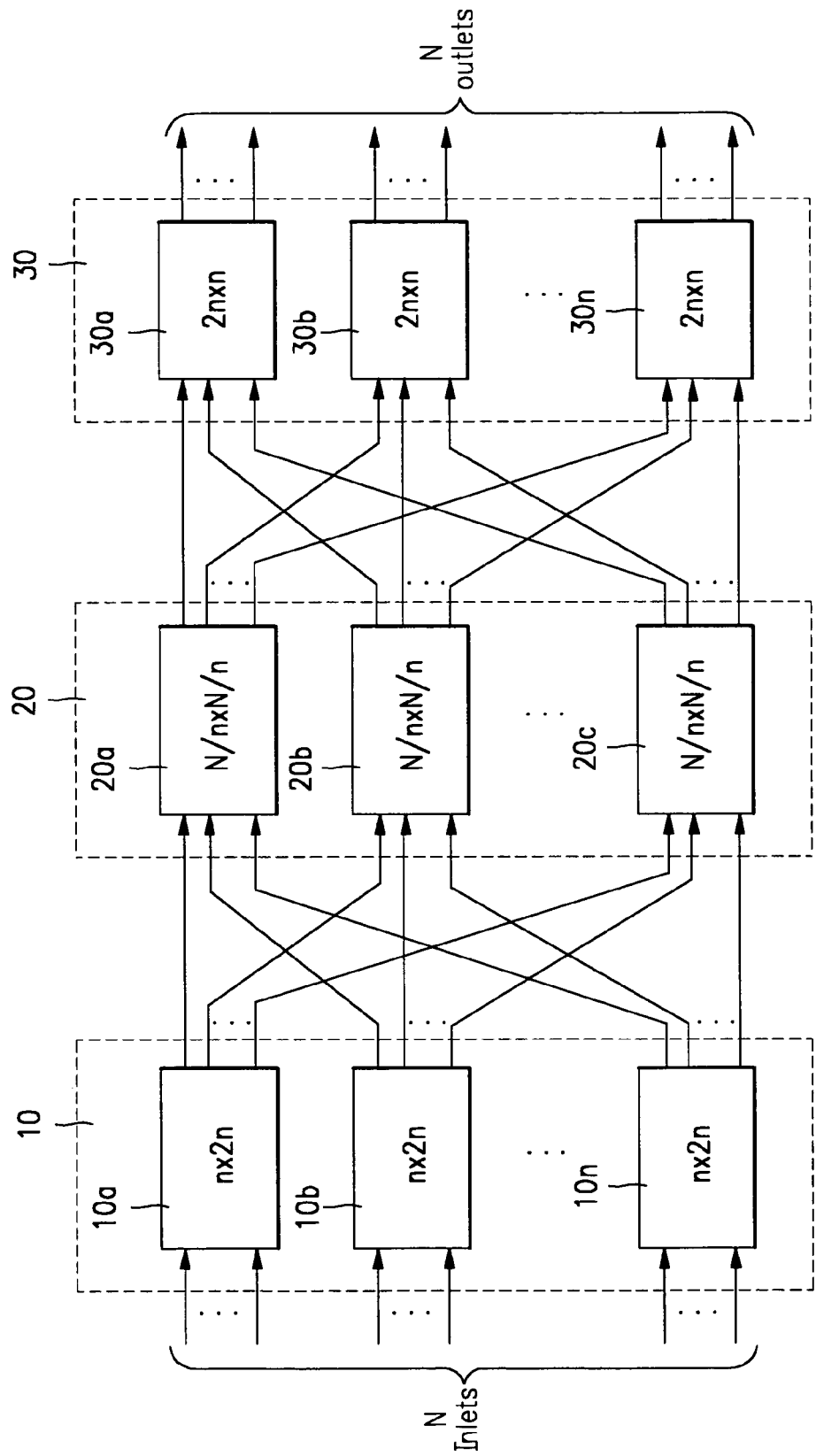
FIG. 1 is a block diagram illustrating the construction of a conventional switch network.
Figure 2:
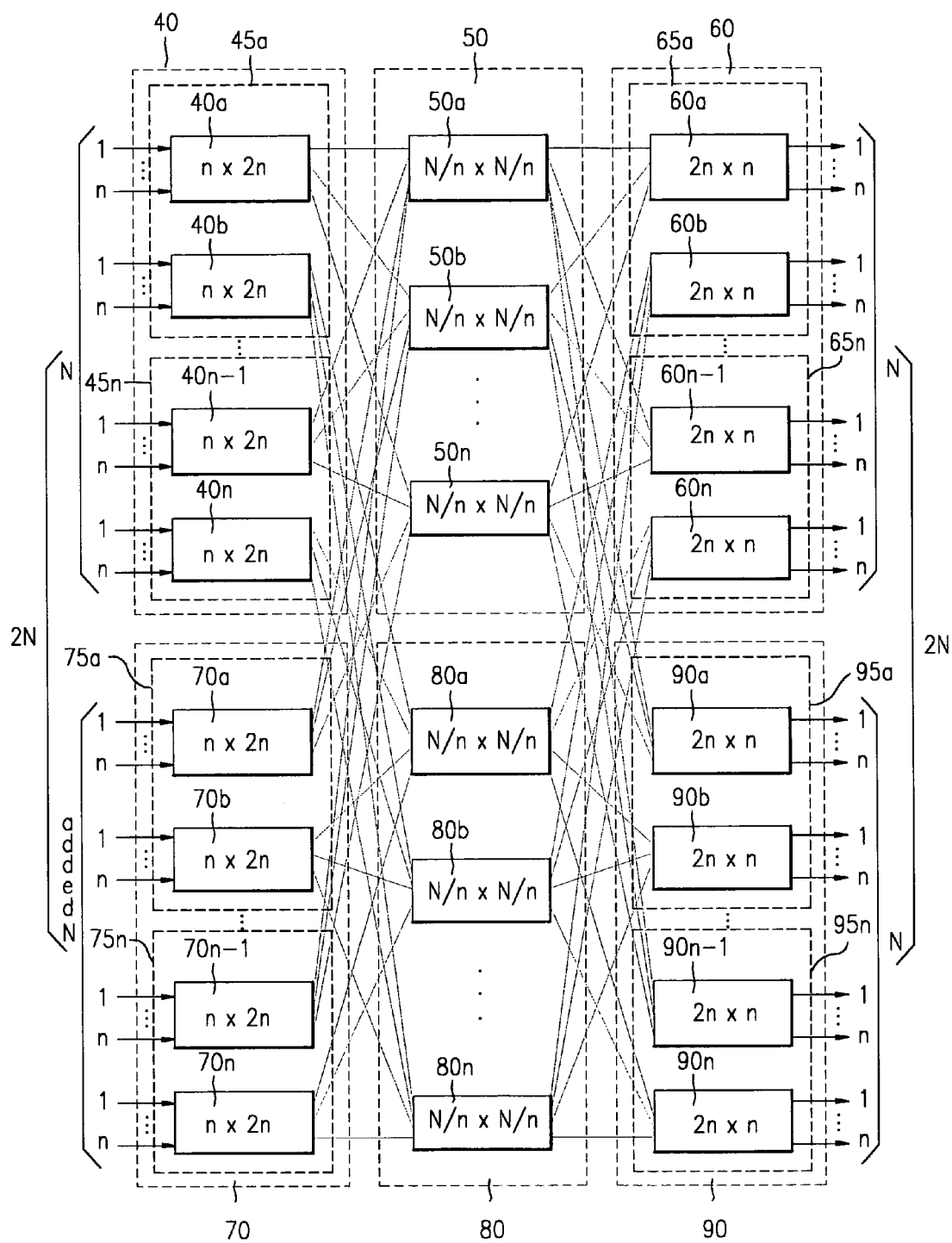
FIG. 2 is a block diagram illustrating the construction of the switch network whose switch capacity is increased by the integral number of times according to a first embodiment of the present invention.

FIG. 2 is a block diagram illustrating the construction of the switch network whose switch capacity is increased by the integral number of times according to a first embodiment of the present invention.

Referring to FIG. 2, the switch network according to the first embodiment of the present invention includes first stages 40 and 70 having a plurality of switching elements 40a–40n and 70a–70n, second stages 50 and 80 having a plurality of switching elements 50a–50n and 80a–80n respectively connected to the switching elements 40a–40n and 70a–70n of the first stages 40 and 70 in a many-to-many relationship, and third stages 60 and 90 having a plurality of switching elements 60a–60n and 90a–90n respectively connected to the switching elements 50a–50n and 80a–80n of the second stages 50 and 80 in a many-to-many relationship.

Here, if the input number of the switching element is defined by n and the whole switch capacity of the switch network is defined by N, the ratios of the input number to the output number of the switching elements provided in the first, second, and third stages are n×2n, N/n×N/n, and 2n×n, respectively.

Accordingly, the switch network according to the first embodiment of the present invention has a symmetrical arrangement based on the second stages 50 and 80. Also, the switching elements provided in the first stages 40 and 70 and the second stages 50 and 80 and the switching elements provided in the second stages 50 and 80 and the third stages 60 and 90 are respectively connected through communication lines (for instance, cables) which can change the input/output connection ports of the switching elements. Accordingly, in case of increasing the switch network, the shelf or mother board of the existing cross connect system are used as they are, and only the input/output connection ports thereof are changed according to the first embodiment of the present invention.

Hereinafter, the switch capacity increasing method for a cross connect system according to the first embodiment of the present invention will be explained in detail.

First, a new switch network is added to the existing switch network. Thereafter, the switching elements 40a–40n, 70a–70n, 60a–60n, and 90a–90n respectively provided in the first stages 40 and 70 and the third stages 60 and 90 of the existing switch network and the new switch network are classified into pairs. FIG. 2 shows 2 pairs of the switching elements 45a, 45b, 75a, 75b, 65a, 65b, 95a, and 95b in each stage. Then, the first switching elements 40a, 40n-1, 70a, and 70n-1 of the pairs 45a, 45b, 75a, and 75b of the switching elements in the first stages 40, 70, 60, and 90 of the existing switch network and the new switch network are connected to the switching elements 50a–50n provided in the second stage 50 of the existing switch network in a many-to-many relationship, and the second switching elements 40b, 40n, 70b, and 70n of the pairs 45a, 45b, 75a, and 75b of the switching elements are connected to the switching elements 80a–80n provided in the second stage 80 of the new switch network in a many-to-many relationship. Thereafter, the first switching elements 60a, 60n-1, 90a, and 90n-1 of the pairs 65a, 65n, 95a, and 95n of the switching elements in the third stages 60 and 90 of the existing switch network and the new switch network are connected to the switching elements 50a–50n provided in the second stage of the existing switch network in a many-to-many relationship, and the second switching elements 60b, 60n, 90b, and 90n of the pairs 65a, 65n, 95a, and 95n of the switching elements are connected to the switching elements 80a–80n provided in the second stage 80 of the new switch network in a many-to-many relationship.

Figure 3:
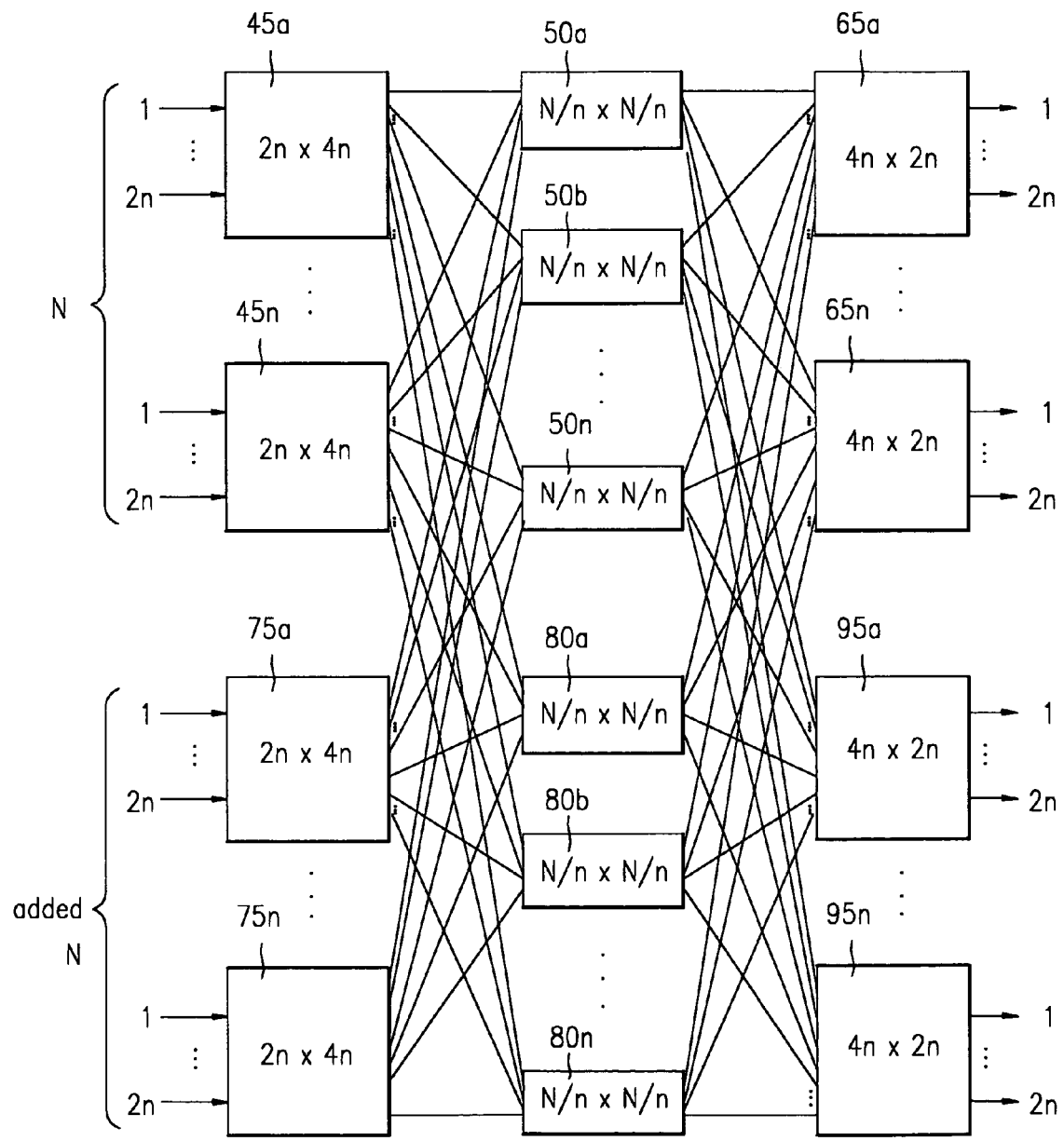
FIG. 3 is a block diagram illustrating the equivalent construction of the switch network of FIG. 2.

As described above, the switch network is increased by classifying the switching elements provided in the first stages 40 and 70 and the third stages 60 and 90 into pairs and then connecting the input/output terminals of the switching elements in a manner as described above. FIG. 3 illustrates the equivalent circuit of the increased switch network of FIG. 2.

According to the first embodiment of the present invention, the whole switch capacity of the increased switch network becomes $2^N$ times as large as that of the previous switch network by adding the second switch network 70, 80, and 90 which is identical to the existing first stage 40, second state 50, and third stage 60. For example, the whole switch capacity of the switch network can be increased from 2 to one of 4, 8, 16, 32, . . . .

In case that the whole switch capacity of the existing switch network is N, and that of the new switch network is 2N, the number and the input/output number of the switching elements provided in the respective stages of the existing switch network and the new switch network are identical.

Figure 4A:
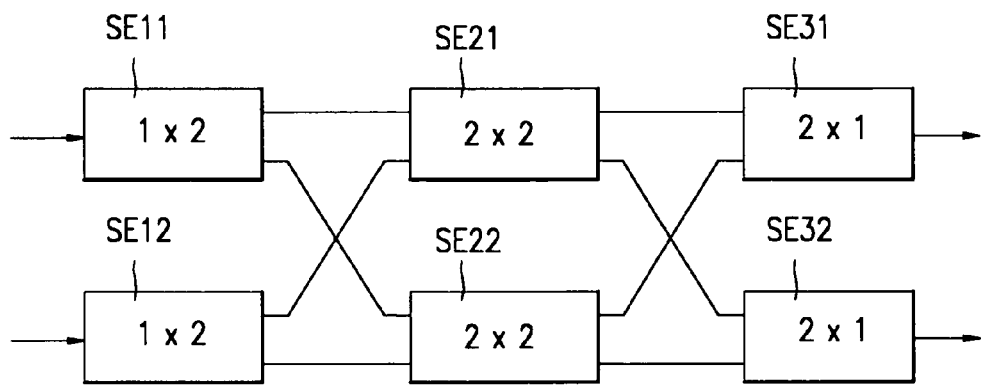
FIG. 4a is a block diagram illustrating the construction of the switch network having the whole switch capacity of 2.
Figure 4B:
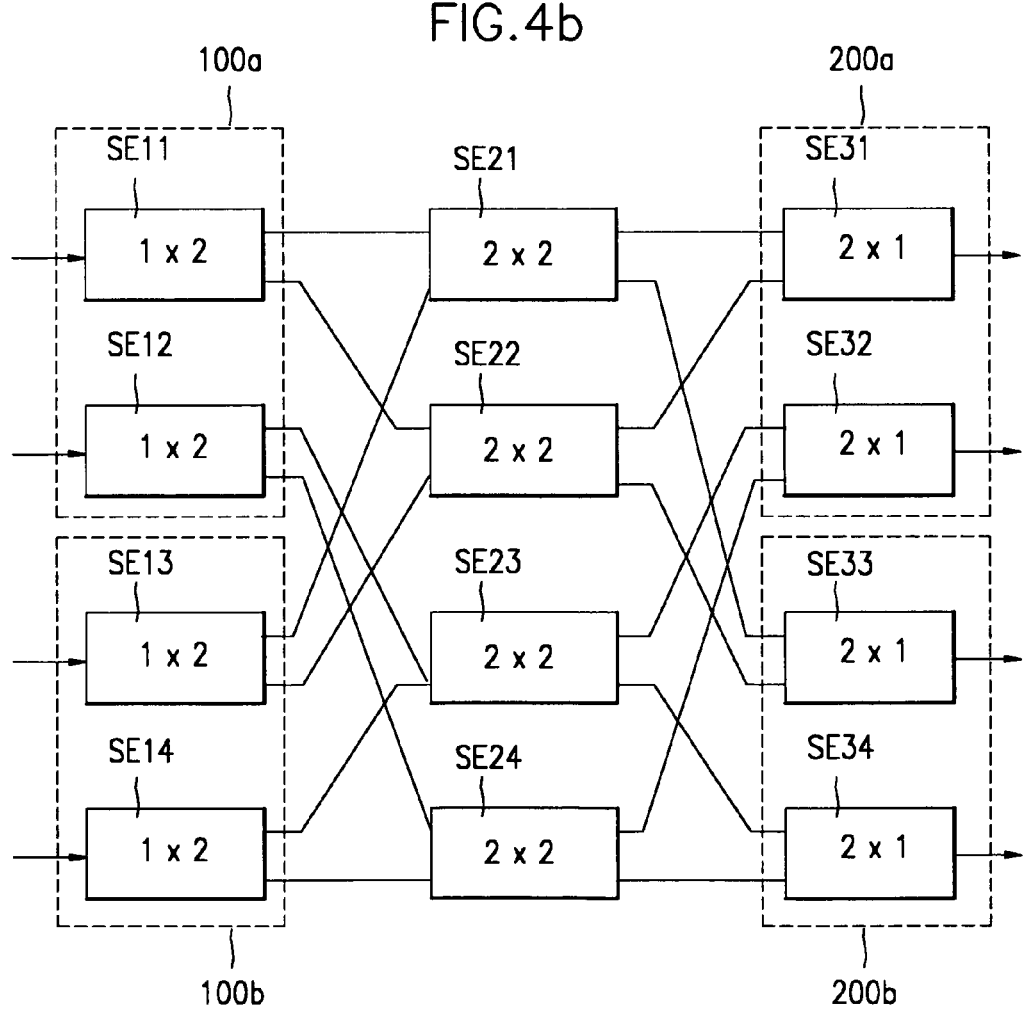
FIG. 4b is a block diagram illustrating the construction of the switch network whose switch capacity is increased from 2 to 4.
Figure 4C:
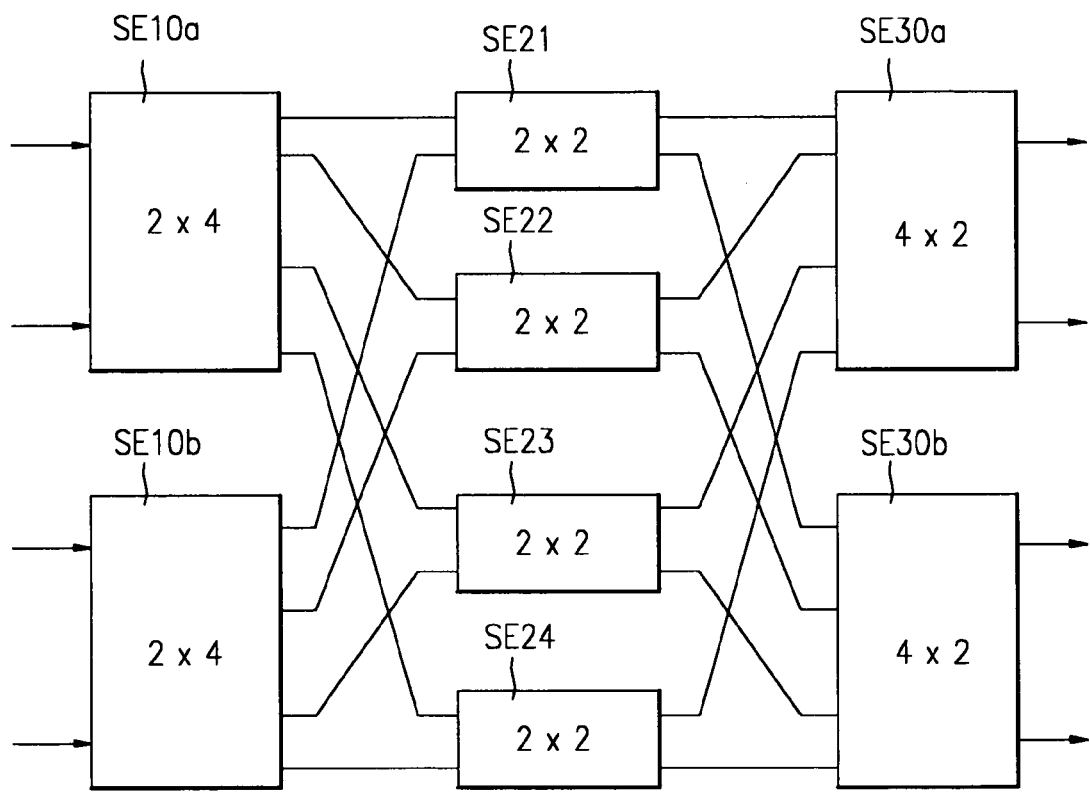
FIG. 4c is a block diagram illustrating the construction of the switch network having the whole switch capacity of 4.

FIGS. 4a to 4c illustrate the first embodiment of the present invention exemplifying that the whole switch capacity of the switch network is increased from 2 to 4.

FIG. 4a is a block diagram illustrating the construction of the switch network having the whole switch capacity of 2. FIG. 4b is a block diagram illustrating the construction of the switch network whose switch capacity is increased from 2 to 4 according to the switch capacity increasing method of the present invention. FIG. 4c is a block diagram illustrating the construction of the switch network initially designed to have the whole switch capacity of 4. Upon comparing the switch networks in FIGS. 4b and 4c, it can be recognized that the same switching paths are provided.

Figure 5A:
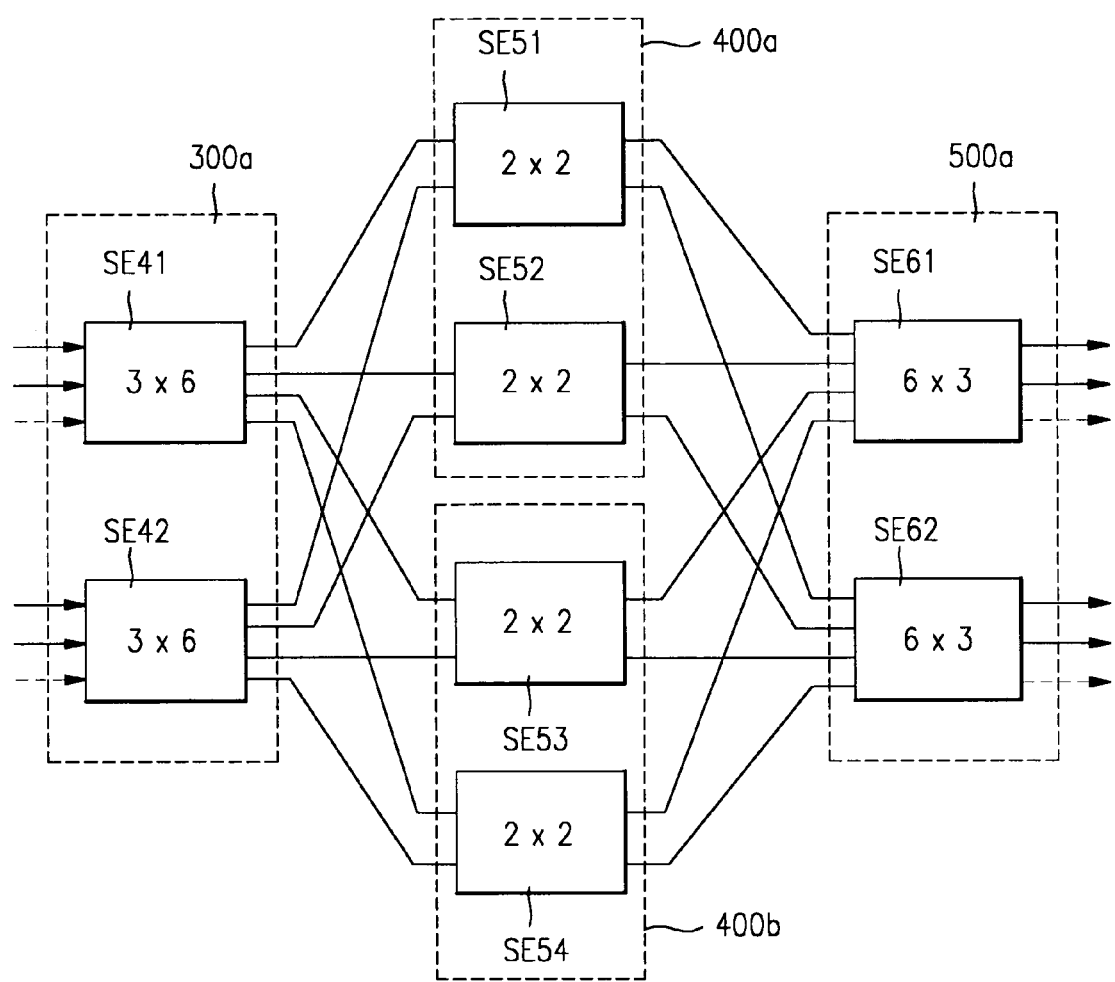
FIG. 5a is a block diagram illustrating the construction of the switch network having the switch capacity of 4×4.
Figure 5B:
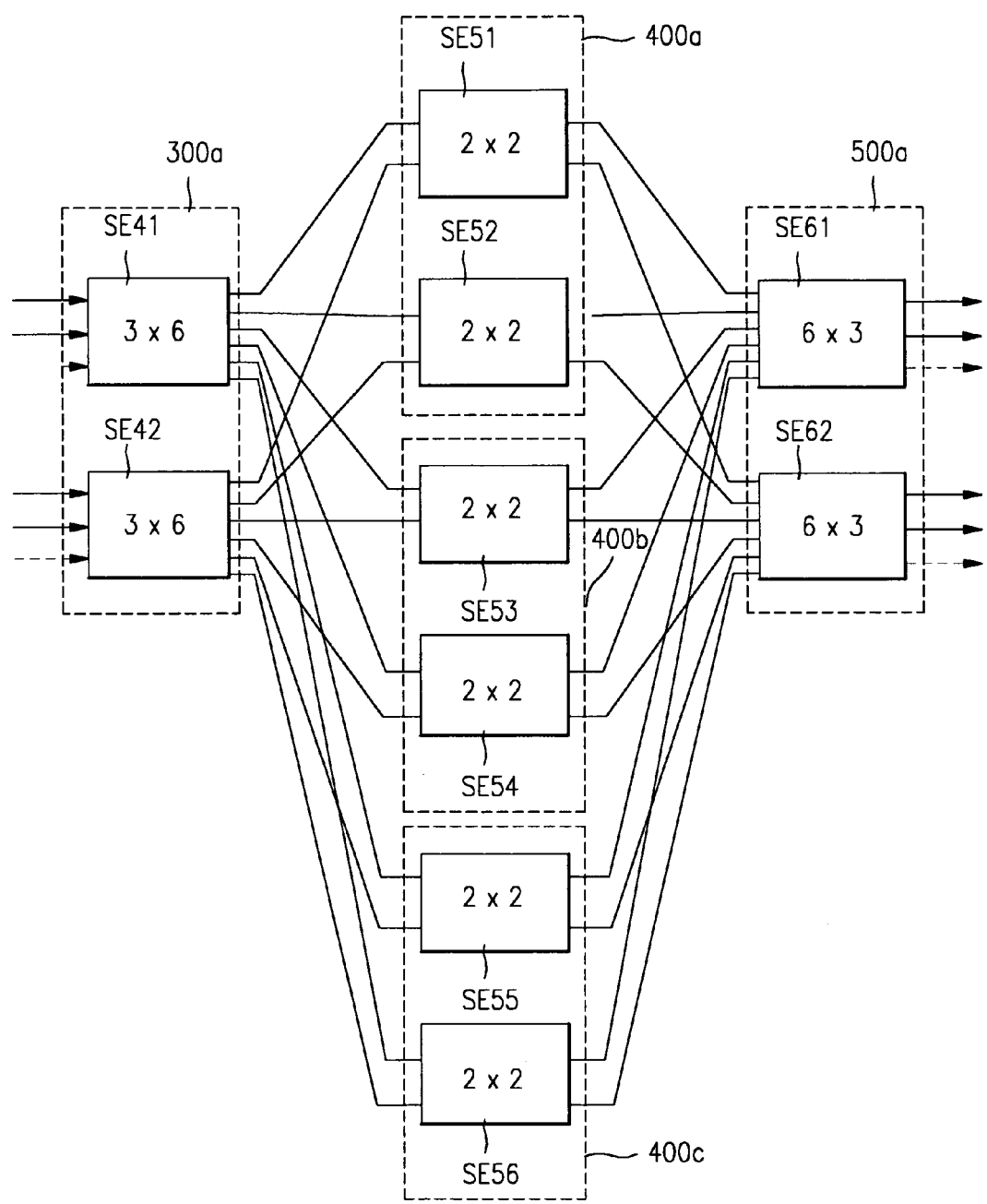
FIG. 5b is a block diagram illustrating the construction of the switch network whose switch capacity is increased from 4×4 to 6×6 according to a second embodiment of the present invention.

FIGS. 5a and 5b show the switch network according to the second embodiment of the present invention wherein the switch capacity is increased fraction times.

FIG. 5a is a block diagram illustrating the construction of the switch network having the switch capacity of 4×4, and FIG. 5b is a block diagram illustrating the construction of the switch network whose switch capacity is increased from 4×4 to 6×6 according to the second embodiment of the present invention.

Referring to FIGS. 5a and 5b, the switch network according to the second embodiment of the present invention includes a first stage 300a having a plurality of switching elements SE41 and SE42, a second stage 400b having a plurality of switching elements SE51–SE56 connected to the switching elements SE41 and SE42 of the first stage 300a in a many-to-many relationship, and a third stage 500a having a plurality of switching elements SE61 and SE62 connected to the switching elements SE51–SE56 of the second stage 400b in a many-to-many relationship.

Here, if the input number of the switching element is defined by n and the whole switch capacity of the switch network is defined by N, the ratio of the input number to the output number of the first stage 300a becomes 1.5 times 2×4 (i.e., 3×6), the ratio of the input number to the output number of the second stages 400a–400c becomes 2×2, and the ratio of the input number to the output number of the third stage 500a becomes 1.5 times 4×2 (i.e., 6×3).

According to the second embodiment of the present invention, when the connection ports of the input/output terminals of the switching elements in the first stage 300a and the third stage 500a are initially connected, the input/output terminals indicated as dotted lines in FIGS. 5a and 5b are not connected. Thereafter, if the increase of the switch capacity by 1.5 times is required due to the increase of subscribers, only the second stage 400c is added to the existing switch network as shown in FIG. 5a, and the input/output terminals which have not been used as indicated as the dotted lines in FIG. 5a are connected in a many-to-many relationship to the switching elements SE55 and SE56 of the newly added second stage 400c. Also, according to the second embodiment of the present invention, the switching elements provided in the first stage 300a and the second stage 400a and the switching elements provided in the second stage 400a and the third stage 500a are respectively connected through communication lines which can change the input/output connection ports of the switching elements. Accordingly, in case of increasing the switch network, the existing shelf or mother board of the existing cross connect system are used as they are, and only a portion of the input/output connection ports thereof is changed according to the second embodiment of the present invention.

Hereinafter, the switch capacity increasing method for a cross connect system according to the second embodiment of the present invention will be explained in detail.

First, the new second stage 400c is added to the existing switch network to increase the whole switch capacity. Thereafter, the input/output terminals, which have not been used (shown as the dotted lines in FIGS. 5a and 5b), of the switching elements SE41, SE42, SE61, and SE62 provided in the first stage 300a and the third stage 500a are respectively connected to the switching elements SE55 and SE56 of the newly added second stage 400c in a many-to-many relationship. In FIGS. 5a and 5b, each dotted block tying the switching elements indicates a module, and the increase of the switch capacity is performed in the unit of a module.

The switch capacity increasing method according to the second embodiment of the present invention wherein the whole switch capacity is increased by 1.5 times will be a more economical and effective method if the whole switch capacity of the switch network becomes larger.

As described above, according to the present invention, the switch capacity of the switch network can be increased by adding a new switch network to the existing switch network, and changing the connection of the communication lines as proposed by the present invention. At this time, the increase of the switch network by both $2^N$ times of 2N and 1.5 times of $2^N$ is possible.

Consequently, according to the present invention, a switch network having a proper switch capacity can be produced when designing or manufacturing a cross connect system, and in case of increasing the switch capacity of the switch network, the existing switch network can be used as it is, thereby preventing unnecessary or excessive expenses from being spared.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of increasing a switch capacity in a switch network system in which three or more switch stages including a plurality of switching elements are connected in serial by using a predetermined logical circuit, the method comprising:

adding switching elements to an intermediate switch stage which is placed between the first stage and last stage, respectively; and connecting extra input/output terminals of switching elements in first and last switch stages with the added switching elements, respectively, wherein the first switch stage includes switching elements of which ratio of the number of input/output is 1.5 times of n×2n, wherein n is defined as the number of input of the switching elements and N is defined as a whole capacity of the switch network.

2. The method of increasing a switch capacity as claimed in claim 1, wherein the each switch element of the intermediate switch stage is connected to the switching elements of the first and last switch stages, the switching elements of the intermediate switch stage having the number of input/output of N/n×N/n, wherein n is the number of inputs of the switching elements and N is a capacity of the switch network.

3. The method of increasing a switch capacity as claimed in claim 1, wherein the connecting is carried out by changing an access port of input/output terminals of the respective switching elements.

4. The method of increasing a switch capacity as claimed in claim 1, wherein the switching elements are added by the unit of module.

5. A method of increasing a switch capacity in a switch network system in which three or more switch stages including a plurality of switching elements, the method comprising:

adding switching elements to an intermediate switch stage which is placed between the first stage and last stage, respectively; and connecting extra input/output terminals of switching elements in first and last switch stages with the added switching elements, respectively, wherein the each switch element of the intermediate switch stage is connected to respective switching element of the intermediate switch terminal, the switching elements of the intermediate switch stage having the number of input/output of 1.5 times of 2n×n.

6. A method of increasing a switch capacity in a switch network system in which three or more switch stages including a plurality of switching elements, the method comprising:

adding switching elements to an intermediate switch stage which is placed between the first stage and last stage, respectively; and connecting extra input/output terminals of switching elements in first and last switch stages with the added switching elements, respectively, wherein switching elements are added to the switch stage of the switch network system, thereby the added switch capacity is increased by the unit of 1.5 times of $2^N$.

7. A method of increasing a switch capacity in a switch network system, the method comprising:

adding a switch including a plurality of switching elements to an intermediate switch stage, wherein the number of input/output of the intermediate switch stage is increased by 1.5 times; and using additional inputs in a first switch stage and additional output in a last switch stage, wherein the additional inputs in the first switch stage and the additional outputs in the last switch stage were unused prior to increasing the switch capacity and wherein used inputs in the first stage and used outputs in the last stage are increased by 1.5 times.

8. The method of claim 7, wherein the switching elements of the first switch stage and last switch stages are each grouped in pairs.

9. The method of claim 7, wherein each switch element of the intermediate stage is connected to switching elements of the first switch stage and last switch stage.

10. The method of claim 7, wherein the switching elements of the intermediate switch stage have N/n inputs and N/n outputs, wherein n is the number of inputs of the switching elements and N is a capacity of the switch network.

11. The method of claim 7, wherein a total number of inputs of each switching element of the first switch stage are predetermined and wherein used inputs are increase by 1.5 times for each switching element of the first switch stage.

12. The method of claim 7, wherein a total number of outputs of each switching element of the last switch stage are predetermined and wherein used outputs are increase by 1.5 times for each switching element of the last switch stage.

* * * * *